United States Patent
Park

(10) Patent No.: US 8,520,048 B2
(45) Date of Patent: Aug. 27, 2013

(54) LASER SCANNING UNIT HAVING FLUX-REDUCTION UNIT AND IMAGE FORMING APPARATUS HAVING THE SAME

(75) Inventor: Chun Seong Park, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 334 days.

(21) Appl. No.: 12/560,835

(22) Filed: Sep. 16, 2009

(65) Prior Publication Data

US 2010/0086329 A1 Apr. 8, 2010

(30) Foreign Application Priority Data

Oct. 2, 2008 (KR) ................. 10-2008-0097021

(51) Int. Cl.
*B41J 27/00* (2006.01)
*G02B 26/10* (2006.01)

(52) U.S. Cl.
USPC ...................................... 347/259; 359/198.1

(58) Field of Classification Search
USPC ............... 347/134, 259; 359/200.1, 200.2, 359/216; 372/24; 310/51; 250/236; 360/98.07, 97.13; 720/649; 358/484
See application file for complete search history.

(56) References Cited

U.S. PATENT DOCUMENTS

| | | | | |
|---|---|---|---|---|
| 5,438,447 | A * | 8/1995 | Kunii | 359/200.1 |
| 5,574,322 | A * | 11/1996 | Nii et al. | 310/90.5 |
| 5,604,621 | A * | 2/1997 | Fujikane | 359/200.1 |
| 5,650,674 | A * | 7/1997 | Hayashi | 310/51 |
| 5,838,001 | A * | 11/1998 | Minakuchi et al. | 250/236 |
| 5,909,339 | A * | 6/1999 | Hong | 360/98.07 |
| 6,822,774 | B2 * | 11/2004 | Worner et al. | 359/200.2 |
| 7,031,104 | B1 * | 4/2006 | Butt et al. | 360/97.13 |
| 7,526,780 | B2 * | 4/2009 | Tokunaga | 720/649 |
| 2004/0246553 | A1* | 12/2004 | Yoshizawa | 359/216 |
| 2006/0198403 | A1* | 9/2006 | Hudson et al. | 372/24 |
| 2007/0216966 | A1* | 9/2007 | Ohsugi | 358/484 |
| 2008/0204539 | A1* | 8/2008 | Itami et al. | 347/134 |
| 2008/0259430 | A1* | 10/2008 | Fukushima et al. | 359/216 |

FOREIGN PATENT DOCUMENTS

KR 10-2005-0060297 6/2005

OTHER PUBLICATIONS

English language abstract of KR 10-2005-0060297, published Jun. 22, 2005.

* cited by examiner

*Primary Examiner* — Stephen Meier
*Assistant Examiner* — Carlos A Martinez
(74) *Attorney, Agent, or Firm* — Stanzione & Kim, LLP

(57) ABSTRACT

A laser scanning unit and an image forming apparatus having the same may include a polygonal mirror connected to a rotor of a driving motor, a member disposed opposite the rotor in the axial direction of a rotating shaft of the driving motor and a flux-reduction unit configured to reduce the flux of air or any other gas flowing in the space between the rotor and the member.

15 Claims, 6 Drawing Sheets ated to a rotor of the driving motor. The polygon mirror may be configured to deflect the light emitted by the light source. The member may have a surface that faces the rotor along an axial direction of a rotating shaft of the driving motor. The flux-reduction unit may be configured to reduce the flux of air flowing between the rotor and the member.

LASER SCANNING UNIT HAVING FLUX-REDUCTION UNIT AND IMAGE FORMING APPARATUS HAVING THE SAME

CROSS-REFERENCE TO RELATED APPLICATION(S)

This application claims the benefit of Korean Patent Application No. 2008-0097021, filed on Oct. 2, 2008 in the Korean Intellectual Property Office, the disclosure of which is incorporated herein by reference in its entirety.

TECHNICAL FIELD

The present disclosure relates generally to a laser scanning unit, and more particularly, to a laser scanning unit having a driving motor with an improved operational reliability.

BACKGROUND OF RELATED ART

A laser scanning unit in an electro-photographic image forming apparatus can scan light corresponding to an image signal on a photoconductive medium to form an electrostatic latent image on the surface of the photoconductive medium.

Generally, such a laser scanning unit includes a driving motor that generates a rotating force and a polygon mirror that is rotated by the driving motor. The polygon mirror has multiple reflecting surfaces along the side surfaces thereof such that the polygon mirror can perform deflection scanning of light incident from a light source. The deflected light is passed through an fθ lens, and is reflected in a direction of a transmission member by a reflection mirror. The light reflected by the reflection mirror is passed through the transmission member, and ultimately to the photoconductive medium to form the electrostatic latent image.

Because of the demand for a compact-sized image forming apparatuses, the laser scanning unit can include a suspending structure wherein a rotor is suspended from a lower portion of a stator. Also, because of such demand for compact size, various components of the image forming apparatus, including the laser scanning unit, are being integrated.

SUMMARY OF THE DISCLOSURE

In accordance with one aspect of the present disclosure, there is provided a laser scanning unit that can include a light source for emitting a light and a light deflector having a driving motor and a polygon mirror attached to a rotor of the driving motor to deflect the light emitted by the light source toward an object to be scanned. The laser scanning unit can further include a member having a surface that faces the rotor along an axial direction of a rotating shaft of the driving motor; and a flux-reduction unit configured to reduce flux of air flowing between the rotor and the member.

The rotor may be disposed below a stator of the driving motor. The rotor may alternatively disposed above a stator of the driving motor.

The flux-reduction unit may be arranged on the member.

The flux-reduction unit has a partition that protrudes along the axial direction of the rotating shaft of the driving motor toward the rotor.

As an example, the partition may comprises a circular partition. Alternatively, the partition may comprise a radial partition. As an another alternative example, the partition may include a honeycomb structure.

According to an another aspect of the present disclosure, an image forming apparatus may include a photoconductive medium for forming thereon an electrostatic latent image by having incident thereupon a light and a developing unit that forms a visible image by developing the electrostatic latent image formed on the photoconductive medium. The image forming apparatus may further include a light scanning unit configured to direct the light to the photoconductive medium. The laser scanning unit may comprise a light source configured to emit light, a light deflector configured to deflect the light emitted by the light source, a member and a flux-reduction unit. The light deflector may include a driving motor and a polygon mirror coupled to a rotor of the driving motor. The polygon mirror may be configured to deflect the light emitted by the light source. The member may have a surface that faces the rotor along an axial direction of a rotating shaft of the driving motor. The flux-reduction unit may be configured to reduce the flux of air flowing between the rotor and the member.

The laser scanning unit may further comprise a lens disposed in an optical path of the light, the lens being configured to correct aberrations in the light deflected by the light deflector.

According to yet another aspect of the present disclosure, a driving motor assembly may be provided to include a driving motor, a member and a flux-reduction unit. The driving motor may comprise a stator having a core and a coil wound around the core, a rotating shaft coupled to the stator and a rotor disposed to rotate about the rotating shaft. The member may be arranged to define a gap between the rotor and the member. The flux-reduction unit may be disposed in the gap. The flux-reduction unit may be configured to reduce a flux of ambient gas flowing in the gap when the rotor rotates.

The ambient gas may, for example, comprise air.

The rotor may be disposed below the stator with respect to the direction of gravity.

The flux-reduction unit may comprise one or more ribs formed on a surface of the member that faces the rotor. The one or more ribs may protrude from the surface of the member toward the rotor along an axial direction of the rotating shaft.

The one or more ribs may comprise at least one circular rib and at least one radial rib. The at least one circular rib may define a circular shape on the surface of the member. The circular shape may be concentric with a circle defined by the rotation of the rotor. The at least one radial rib may extend along the surface of the member from the center of the at least one circular rib in a radially outward direction.

BRIEF DESCRIPTION OF THE DRAWINGS

Various aspects and advantages of the disclosure will become apparent and more readily appreciated from the following description of the embodiments, taken in conjunction with the accompanying drawings, in which.

DETAILED DESCRIPTION OF SEVERAL EMBODIMENTS

Figure 1:
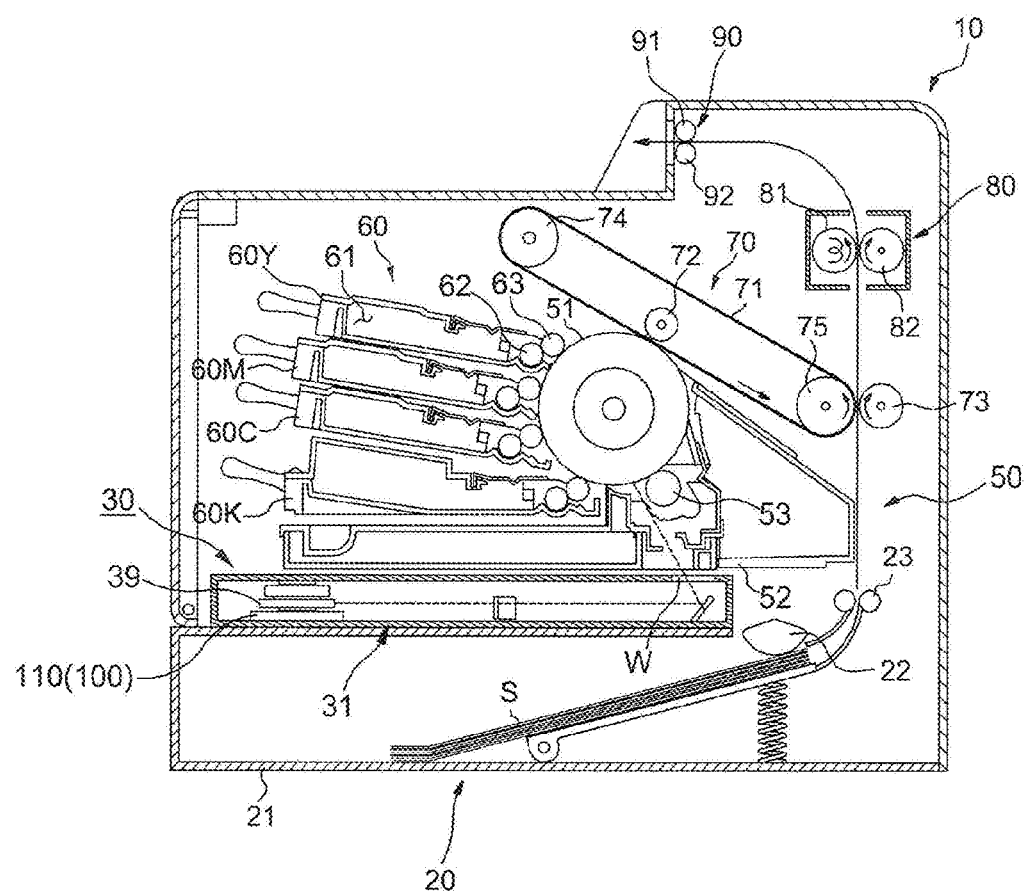
FIG. 1 is a sectional view showing the structure of an image forming apparatus according to an embodiment of the present disclosure.

Reference will now be made in detail to several embodiments of the present disclosure, examples of which are illustrated in the accompanying drawings, wherein like reference numerals refer to the like elements throughout.

FIG. 1 is a sectional view showing the structure of an image forming apparatus according to an embodiment of the present disclosure.

Referring to FIG. 1, the image forming apparatus can include a main body 10, a printing medium feeding unit 20, a laser scanning unit 30, a photoconductive medium unit 50, a developing unit 60, a transfer unit 70, a fixing unit 80 and a discharging unit 90.

The main body 10 can be configured to define the external appearance of the image forming apparatus, and to support or hold therein various components of the image forming apparatus.

The printing medium feeding unit 20 can include a cassette 21 configured to store one or more printing mediums S, a pickup roller 22 configured to pick up the printing medium S from the cassette 21, and a feeding roller 23 configured to supply the picked up printing medium S to the transfer unit 70. The pickup roller 22 can, for example, pick up one sheet of the printing medium S at a time.

The laser scanning unit 30 can include a case 31 having disposed therein a light source 32 (see FIG. 2) configured to emit light and an optical scanning system. The laser scanning unit 30 will be explained in greater detail below.

The photoconductive medium unit 50 can include a photoconductive medium 51, a photoconductive medium housing 52 and a charging roller 53. The photoconductive medium 51 can be rotatably mounted on the photoconductive medium housing 52. The surface of the photoconductive medium 51 can be charged by the charging roller 53 to a predetermined electric potential before the light emitted from the laser scanning unit 30 is irradiated on the surface of the photoconductive medium 51 to produce an electrostatic image.

The developing unit 60 can include multiple developer devices, such as, for example, developer devices 60Y, 60M, 60C and 60K, each may be configured to store a supply of developer in one of the colors. For example, the developer device 60Y can store yellow (Y) developer, the developer device 60M can store magenta (M) developer, the developer device 60C can store cyan (C) developer, and the developer device 60B can store and black (B) developer. By supplying the developer in various colors to the surface of the photoconductive medium 51 on which the electrostatic latent image has been formed, the developing unit 60 can develop the electrostatic latent image into a visible image in various colors.

Each of the developer devices 60Y, 60M, 60C and 60K, can include a developer storage 61, a supplier roller 62, and a developer roller 63. The developer storage 61 can be configured to store the developer to be supplied to the photoconductive medium 51. The supplier roller 62 can be configured to supply the developer stored in the developer storage 61 to the developer roller 63. The developer roller 63 can be configured to attach the developer to the surface of the photoconductive medium 51 having the electrostatic latent image to form the visible image.

The transfer unit 70 can include a transfer belt 71, a first transfer roller 72, and a second transfer roller 73. The transfer belt 71 can be configured to run at the same linear velocity of the photoconductive medium 51 and can be supported by support rollers 74 and 75. The first transfer roller 72 can be disposed opposite the photoconductive medium 51 with the transfer belt 71 disposed therebetween such that the visible image formed on the photoconductive medium 51 can be transferred to the transfer belt 71. The second transfer roller 73 can be disposed opposite the support roller 75 with the transfer belt 71 disposed therebetween. When the image is being transferred from the photoconductive medium 51 to the transfer belt 71, the second transfer roller 73 can be separated or moved apart from the transfer belt 71. Once the transfer of the image from the photoconductive medium 51 to the transfer belt 71 is completed, the second transfer roller 73 can be brought back in contact with the transfer belt 71. Upon contact, the image in the transfer belt 71 can be transferred to the printing medium S as it passes between the transfer belt 71 and the second transfer roller 73.

The fixing unit 80 can include a heating roller 81 having a heat source and a pressing roller 82 disposed opposite the heating roller 81. When the printing medium passes between the heating roller 81 and the pressing roller 82, the image on the surface of the printing medium can be fixed to the printing medium by heat produced by the heating roller 81 and pressure between the heating roller 81 and the pressing roller 82 exerted by the pressing roller 82.

The discharge unit 90 can include a paper discharge roller 91 and a backup roller 92. The discharge unit 90 can be configured to discharge the printing medium S that has passed through the fixing unit 80 out of the main body 10.

Figure 2:
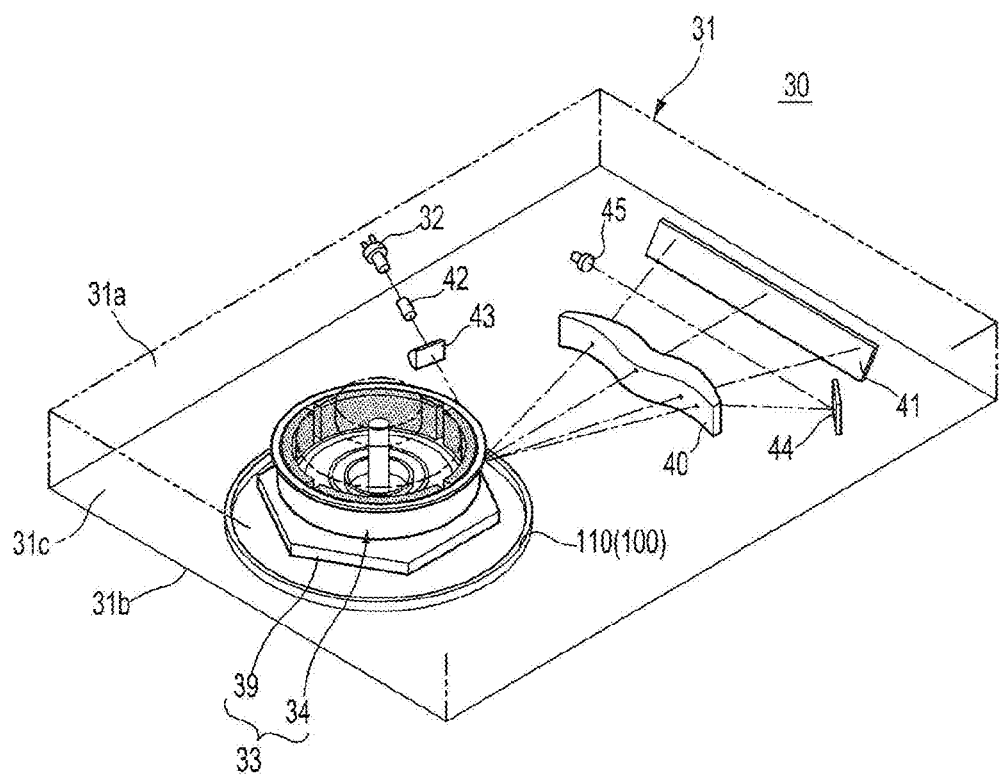
FIG. 2 is a perspective view showing the structure of a laser scanning unit of the image forming apparatus according to an embodiment of the present disclosure.
Figure 3:
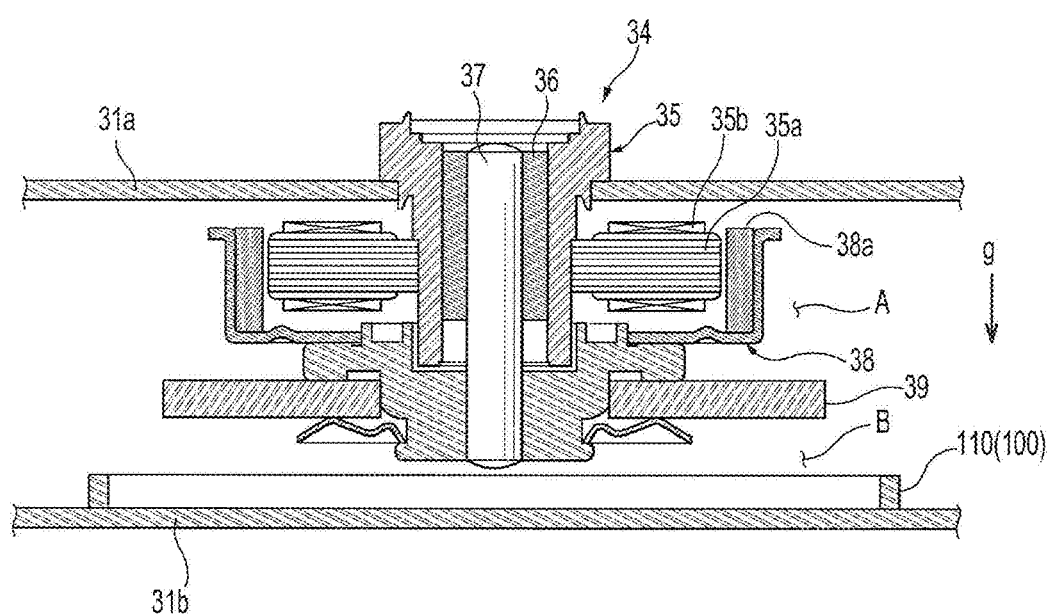
FIG. 3 is a cross-sectional view of a driving motor and a polygon mirror of the image forming apparatus according to an embodiment of the present disclosure.
Figure 4:
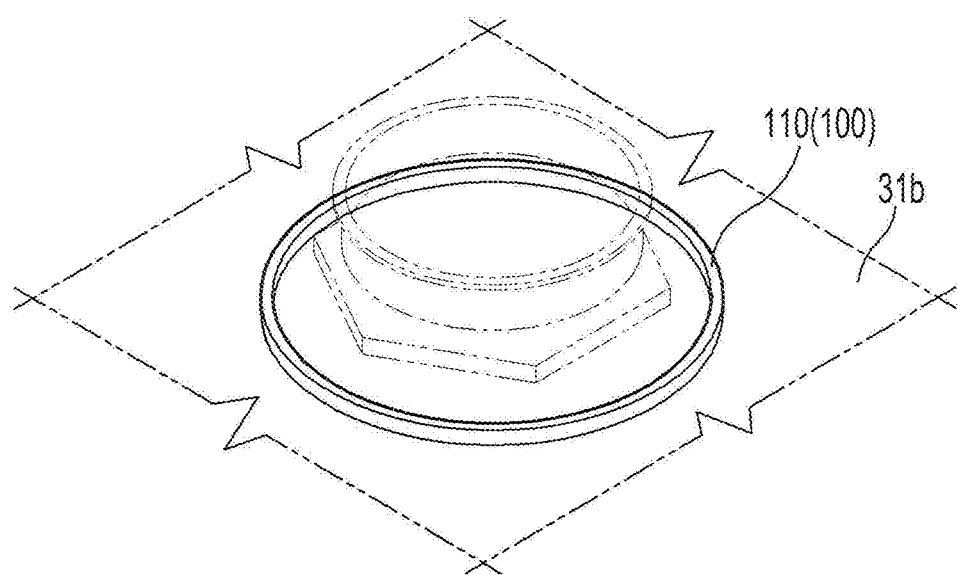
FIG. 4 is a perspective view of a flux-reduction unit of the image forming apparatus according to an embodiment of the present disclosure.

FIG. 2 is a perspective view showing a laser scanning unit according to an embodiment of the present disclosure; FIG. 3 is a sectional view of a driving motor and a polygon mirror according to an embodiment of the present disclosure; and FIG. 4 is a perspective view of a flux-reduction unit according to an embodiment of the present disclosure.

As shown in FIG. 2, the laser scanning unit 30 can include the case 31 having a transmission member W (see FIG. 1) that allows the light produced by the laser scanning unit 30 out of the case 31, and an optical scanning system disposed in the case 31.

The case 31 can include an upper member 31a, a lower member 31b and a side member 31c formed between the upper member 31a and the lower member 31b. A stator 35 (see FIG. 3) of a driving motor 34, which will be described below in greater detail, may be supported by the upper member 31a of the case 31.

The optical scanning system according to an embodiment can include a light source 32 configured to emit light based on information provided by an image signal, an optical deflector 33 configured to deflect the light emitted from the light source 32, an fθ lens 40 configured to correct aberrations on the deflected light produced by the optical deflector 33, and a reflection mirror 41 configured to reflect the light that passes through the fθ lens 40 in the direction of the photoconductive medium 51. The optical scanning system can also include a collimating lens 42 configured to focus the light emitted by the light source 32 and a cylindrical lens 43 configured to modify the light provided along an optical path defined by the light source 32 and the optical deflector 33. The optical scanning system can further include a light detection mirror 44 and a light detection sensor 45 that can be collectively used to define synchronization signals.

The optical deflector 33 can include a driving motor 34 and a polygon mirror 39 configured to be rotated by the driving motor 34. The polygon mirror 39 can include multiple reflection surfaces along the sides thereof to deflect light from the light source 32.

Referring to FIG. 3, the driving motor 34 can include the stator 35, rotor 38 and a rotating shaft 37. The stator 35 may include a core 35b and a coil 35a wound around the core 35b. The rotor 38 may include one or more permanent magnets 38a configured to electromagnetically interacting with the coil 35a of the stator 35. The rotating shaft 37 may include one end portion thereof rotatably coupled to a bearing 36 formed at the stator 35. The polygon mirror 39 can be coupled to the rotor 38 such that the polygon mirror 39 can rotate along with the rotor 38.

When electrical power is applied to the coil 35a of the stator 35, the rotor 38 can be rotated by the interaction that occurs between the coil 35a of the stator 35 and the permanent magnets 38a of the rotor 38. Because the rotor 38 rotates as a result of the above-described interaction, the polygon mirror 39 also rotates.

The laser scanning unit 30 can include a flux-reduction unit 100 configured to reduce or limit the flux in the an air in the vicinity of the lower member 31b facing the rotor 38. According to an embodiment, the flux-reduction unit 100 can comprise a circular partition 110 that protrudes from the lower member 31b, and that corresponds to, for example, the circumference of the rotation of the polygon mirror 39.

In an embodiment of the laser scanning unit 30, the rotor 38 connected to the polygon mirror 39, or the rotating shaft 37 connected to the rotor 38, or both can be prevented from being separated from the stator 35 by a flux-reduction unit, such as, for example, the flux-reduction unit 100 shown in FIG. 4.

When the rotor 38 rotates, a pressure differential may result between the upper space A and the lower space B with respect to the polygon mirror 39 (see FIG. 3) stemming from any difference between the respective fluxes of flow of air (or any other ambient medium present inside the case 31) in the upper space A and the lower space B. When a sufficient pressure difference occurs, the rotor 38 may move along the axial direction of rotating shaft 37, which may in turn result in the rotor 38 inclining to one side or even separating from the stator 35 as a result of a lift produced by the pressure difference.

When a lifting force is applied to the rotor 38 in the direction of the stator 35, the movement of the rotor 38 in the axial direction of the rotating shaft 37 can be restricted or limited by the stator 35. However, when the lifting force is directed in the opposite direction, i.e., in the direction away from the stator 35, the rotor 38 or the rotating shaft 37, or both, could separate from the stator 35.

Because of the suspended structure of driving motor 34 in the laser scanning unit 30, the rotor 38 is more likely to separate from the stator 35 when low pressure is generated at the lower space B. A suspended structure herein refers to a structure in which the rotor 38 is suspended from a lower portion of the stator 35 in the direction g (e.g., the direction of the gravitational force). In other words, in a suspended structure, the rotor 38 can be coupled to the stator 35 in such a manner that the gravitational force acts to separate the rotor 38, or the rotating shaft 37 connected with the rotor 38, from the stator 35.

A resistance in the air flow between the rotor 38 and the lower member 31b can be provided by the flux-reduction unit 100. Thus, by preventing the pressure in the lower space B from becoming lower than the pressure in the upper space A, it is possible to prevent a downward separation (e.g., in the direction g) of the rotor 38 connected to the polygon mirror 39. As a result, the operational reliability of the driving motor 34 can be improved. Moreover, although the driving motor 34 has a suspended structure, the use of the flux-reduction unit 100 can result in a considerable reduction in the required space between the rotor 38 and the lower member 31b.

In some embodiments, the flux-reduction unit can be used with a driving motor having a non-suspended structure in which a rotor of the driving motor is disposed in an upper portion of a stator to prevent floating of the rotor. In such embodiments, by providing or positioning the flux-reduction unit 100 with the housing or the case member that faces the rotor to limit the flux of the air that flows between the rotor and the member, the floating or vibration of the rotor caused by a lifting force produced by such flow can be prevented.

Figure 5:
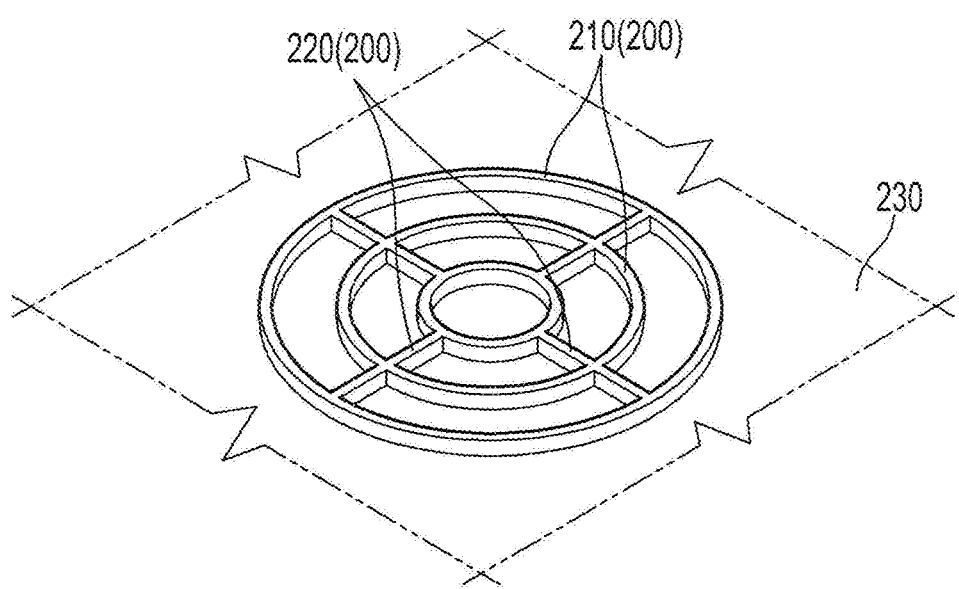
FIG. 5 is a perspective view of a flux-reduction unit of an image forming apparatus according to another embodiment of the present disclosure.

The flux-reduction unit 100 can have many various configurations. For example, as shown in FIG. 5, a flux-reduction unit 200 according to alternative embodiments may include at least one circular partition 210 and at least one radial partition 220. According to other alternative embodiment, the flux-reduction unit 200 can even be configured to include only the radial partition 220. The reference numeral 230 shown in FIG. 5 can represent a member that faces the rotor (not shown) of a motor that includes the flux-reduction unit 200.

Figure 6:
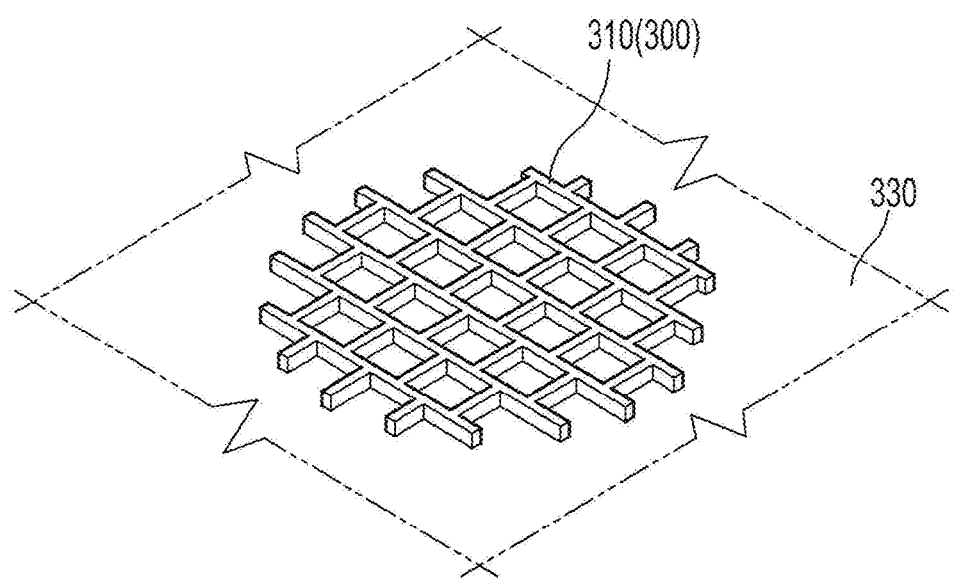
FIG. 6 is a perspective view of a flux-reduction unit of an image forming apparatus according to yet another embodiment of the present disclosure.

As shown in FIG. 6, a flux-reduction unit 300 according to yet another embodiment may include a honeycomb-structured partition 310. The reference numeral 330 shown in FIG. 6 can represent a casing member facing the rotor (not shown) of a driving motor that includes the flux-reduction unit 300.

Hereinafter, an example of the operation of an image forming apparatus having the above-described structure will be described. When a printing operation is started, the surface of the photoconductive medium 51 is evenly charged by the charging roller 53. The laser scanning unit 30 can scan the charged surface of the photoconductive medium 51 with light in accordance with data representative of an image of a certain color, such as yellow, for example. Therefore, an electrostatic latent image that corresponds to the yellow contents of an image (i.e., a yellow image) is formed on the photoconductive medium 51.

A developing bias can be applied to the developer roller 63 of the yellow developer device 60Y such that yellow developer can attach to the electrostatic latent image to form a yellow visible image on the photoconductive medium 51. The yellow visible image can be transferred to the transfer belt 71 by the first transfer roller 72.

When the transfer of yellow images for one page is complete, the laser scanning unit 30 can scan the photoconductive medium 51 with light having information associated with data of another color, such as magenta, for example, to form an electrostatic latent image on the photoconductive medium 51 for a magenta image. The magenta developer device 60M can supply magenta developer to the electrostatic latent image to form a magenta visible image. The magenta visible image on the photoconductive medium 51 can be transferred to the transfer belt 71 by the first transfer roller 72. In this process, the magenta visible image can be superposed on the yellow visible image already transferred to the transfer belt 71.

By repeating the above-described processes for cyan and black images, a full-color image that includes yellow, magenta, cyan and black images superposed, can be formed on the transfer belt 71. The full-color image can be transferred to a printing medium S passing between the transfer belt 71 and the second transfer roller 72. The printing medium S can be discharged to the outside of the image forming apparatus after passing through the fixing unit 80 and the discharging unit 90.

Although the present disclosure describes various embodiments, it should be apparent to those skilled in the art that the embodiments of the laser scanning unit described herein can be used with many types of image forming apparatuses, which may not have been specifically described herein.

Moreover, the motor assembly according to the embodiments of the present disclosure can be used in other structures besides the laser scanning unit. Any motor assembly that includes the arrangement of a stator and a rotor coupled to the stator where the rotor may be moveable along the axial direction of the rotating shaft can befit from employing the flux-reduction unit according to one or more of the embodiments of the present disclosure that may reduce the likelihood of the rotor being separated from the stator, or being vibrated, by a lifting force.

Furthermore, although in certain embodiments above described, the member facing the rotor was described as a surface constituting the case of the laser scanning unit, the form and the function of such member need not be so restricted. For example, the member can be a surface of any other component or part of the image forming apparatus.

Although several embodiments have been shown and described, it would be appreciated by those skilled in the art that changes can be made in these embodiments without departing from the principles and spirit of the disclosure, the scope of which is defined in the claims and their equivalents.

What is claimed is:

1. A laser scanning unit, comprising:
   a light source to emit a light; and
   a light deflector disposed on a first member, the light deflector comprising:
      a driving motor having a suspended structure comprising a stator, a rotor, and a polygonal mirror, the stator being fixedly connected to the first member, the rotor being rotatably connected to the stator such that a gravitational force acts to separate the rotor from the stator, and the polygonal mirror attached to the rotor to deflect the light emitted by the light source toward an object to be scanned;
      a second member having a surface that faces the rotor, the rotor being disposed between the first member and the second member; and
      a flux-reduction unit disposed on the surface of the second member to reduce flux of air flowing between the rotor and the second member.

2. The laser scanning unit according to claim 1, wherein the flux-reduction unit comprises a partition that protrudes toward the rotor from the second member.

3. The laser scanning unit according to claim 2, wherein the partition comprises a circular partition.

4. The laser scanning unit according to claim 2, wherein the partition comprises a radial partition extending along the surface of the second member from a central portion of the rotor to an outer portion of the rotor.

5. The laser scanning unit according to claim 2, wherein the partition comprises a honeycomb structure.

6. An image forming apparatus comprising:
   a laser scanning unit configured to direct a light to a photoconductive medium, the laser scanning unit comprising:
      a light source to emit light; and
      a light deflector disposed on a first member, the light deflector comprising:
         a driving motor having a suspended structure comprising a stator, a rotor, and a polygonal mirror, the stator being fixedly connected to the first member, the rotor being rotatably connected to the stator such that a gravitational force acts to separate the rotor from the stator, and the polygonal mirror being attached to the rotor to deflect the light emitted by the light source toward the photoconductive medium;
      a second member having a surface that faces the rotor, the rotor being disposed between the first member and the second member; and
      a flux-reduction unit disposed on the second member to reduce flux of air flowing between the rotor and the second member.

7. The image forming apparatus according to claim 6, wherein the laser scanning unit further comprises:
   a lens disposed in an optical path of the light, the lens being configured to correct aberrations in the light deflected by the light deflector.

8. The image forming apparatus according to claim 6, wherein the flux-reduction unit comprises a partition that protrudes toward the rotor from the second member.

9. The image forming apparatus according to claim 8, wherein the partition comprises a circular partition.

10. The image forming apparatus according to claim 8, wherein the partition comprises a radial partition extending along the surface of the second member from a central portion of the rotor to an outer portion of the rotor.

11. The image forming apparatus according to claim 8, wherein the partition comprises a honeycomb structure.

12. A driving motor assembly, comprising:
   a driving motor having a suspended structure and being disposed on a first member, the driving motor comprising:
      a stator having a core and a coil wound around the core, the stator being fixedly connected to the first member;
      a rotating shaft coupled to the stator; and
      a rotor disposed to rotate about the rotating shaft, the rotor being rotatably connected to the stator such that a gravitational force acts to separate the rotor from the stator;
   a second member arranged to define a gap between the rotor and the second member, the rotor being disposed between the first member and the second member; and
   a flux-reduction unit disposed on the second member in the gap, the flux-reduction unit being configured to reduce a flux of ambient gas flowing in the gap when the rotor rotates.

13. The driving motor assembly according to claim 12, wherein the ambient gas comprises air.

14. The driving motor assembly according to claim 12, wherein the flux-reduction unit comprises one or more ribs formed on a surface of the second member that faces the rotor, the one or more ribs protruding from the surface of the member toward the rotor.

15. The driving motor assembly according to claim 14, wherein the one or more ribs comprises at least one circular rib and at least one radial rib, the at least one circular rib defining a circular shape on the surface of the second member, the circular shape being concentric with a circle defined by a rotation of the rotor, the at least one radial rib extending along the surface of the second member from a central portion of the rotor to an outer portion of the rotor.

* * * * *